Nov. 2, 1965 R. B. SHULTERS 3,214,941
IMPULSE TOOL
Filed Sept. 27, 1963 4 Sheets-Sheet 1
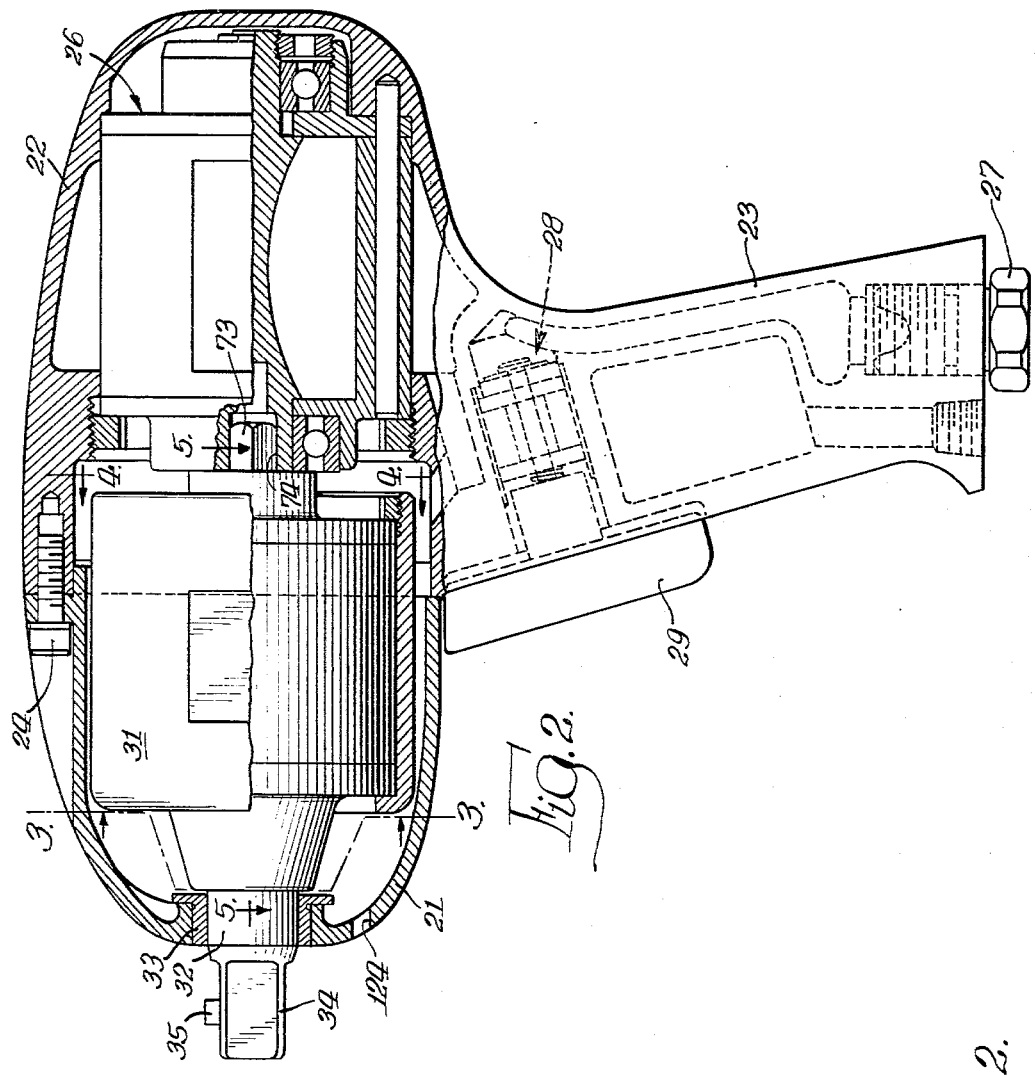
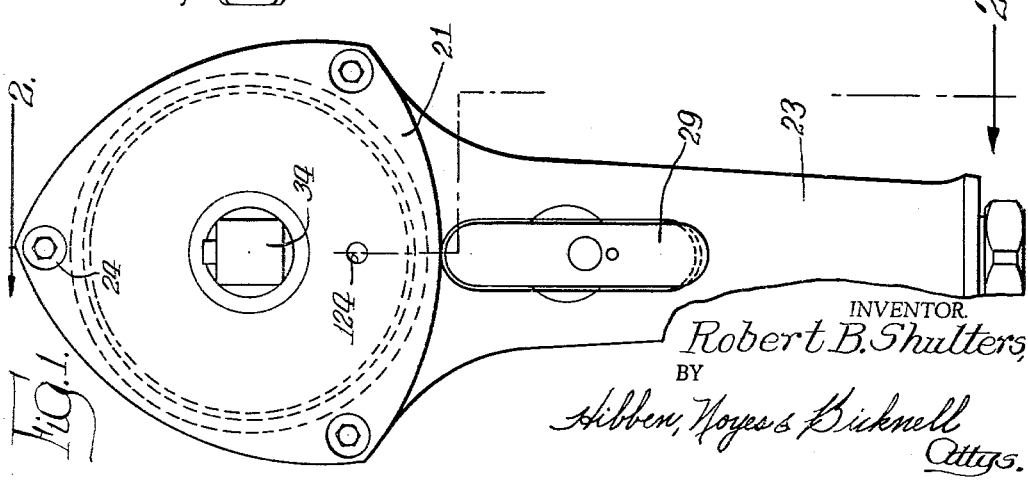
INVENTOR.
Robert B. Shulters
BY
Hibben, Noyes & Bicknell
Attys.

Nov. 2, 1965 R. B. SHULTERS 3,214,941
IMPULSE TOOL
Filed Sept. 27, 1963 4 Sheets-Sheet 2
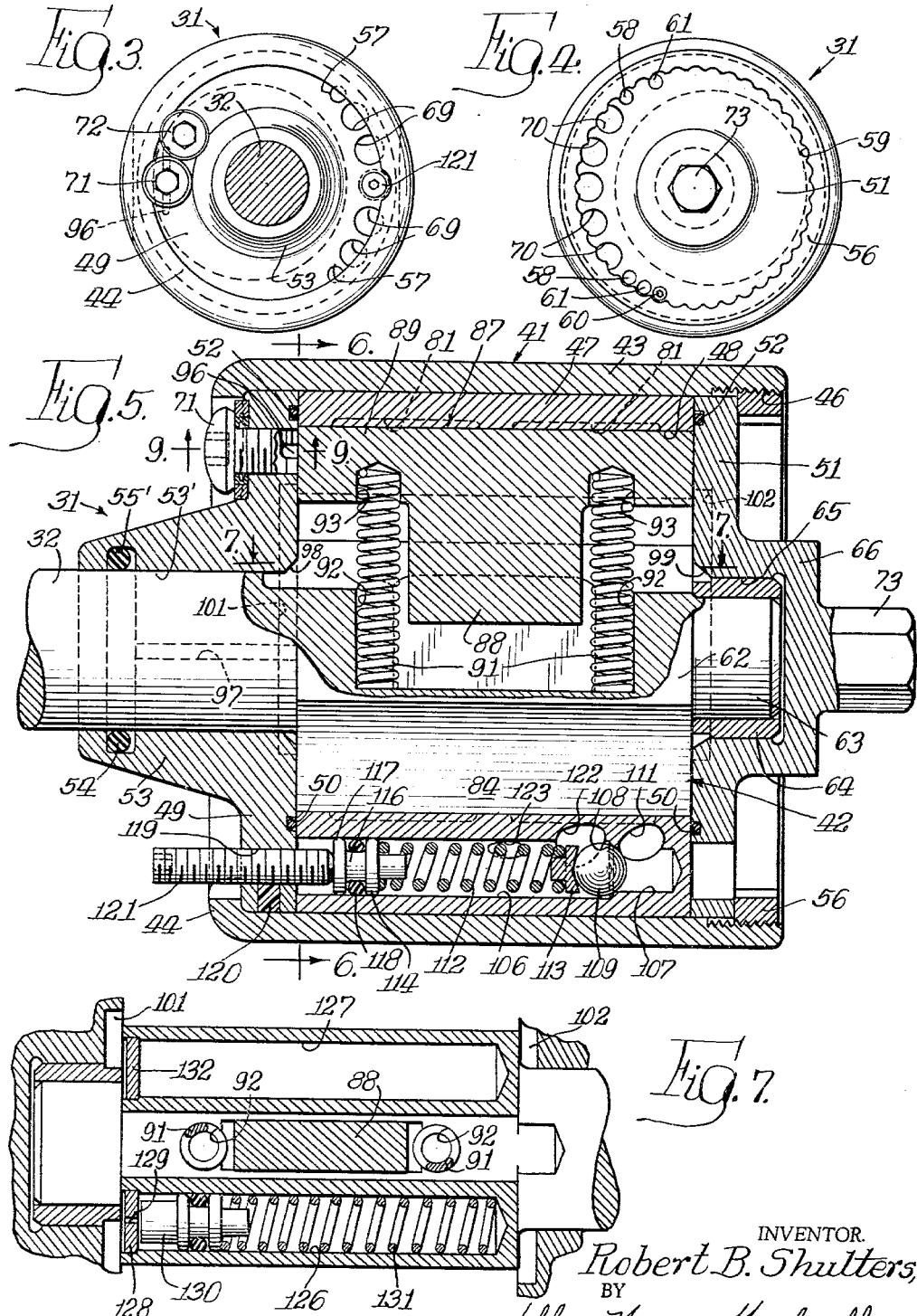
INVENTOR.
Robert B. Shulters,
BY
Hibben, Noyes & Bicknell
Attys.

Nov. 2, 1965 R. B. SHULTERS 3,214,941
IMPULSE TOOL
Filed Sept. 27, 1963 4 Sheets-Sheet 3
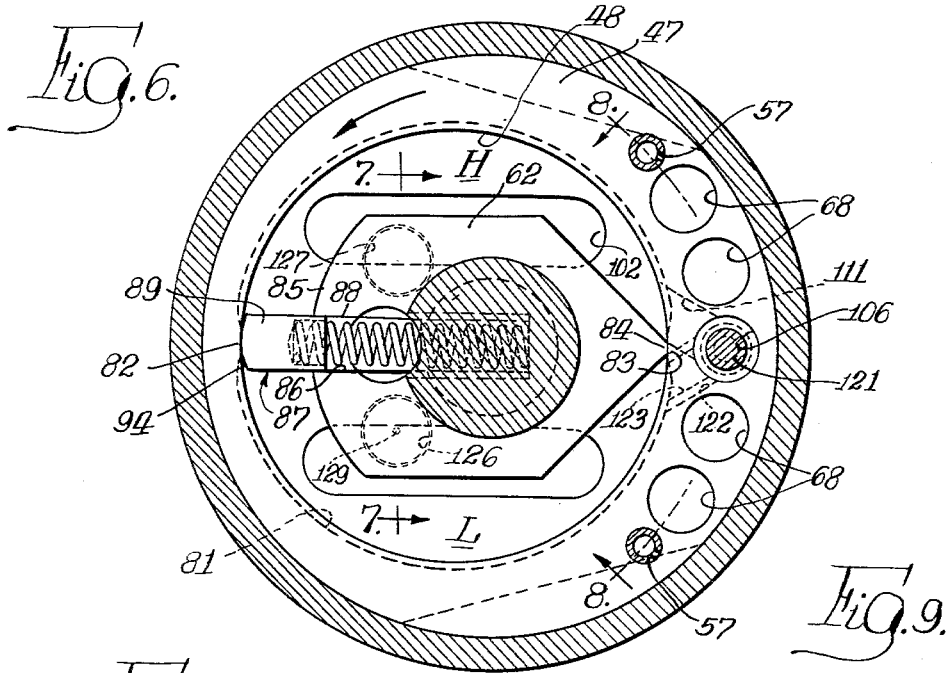
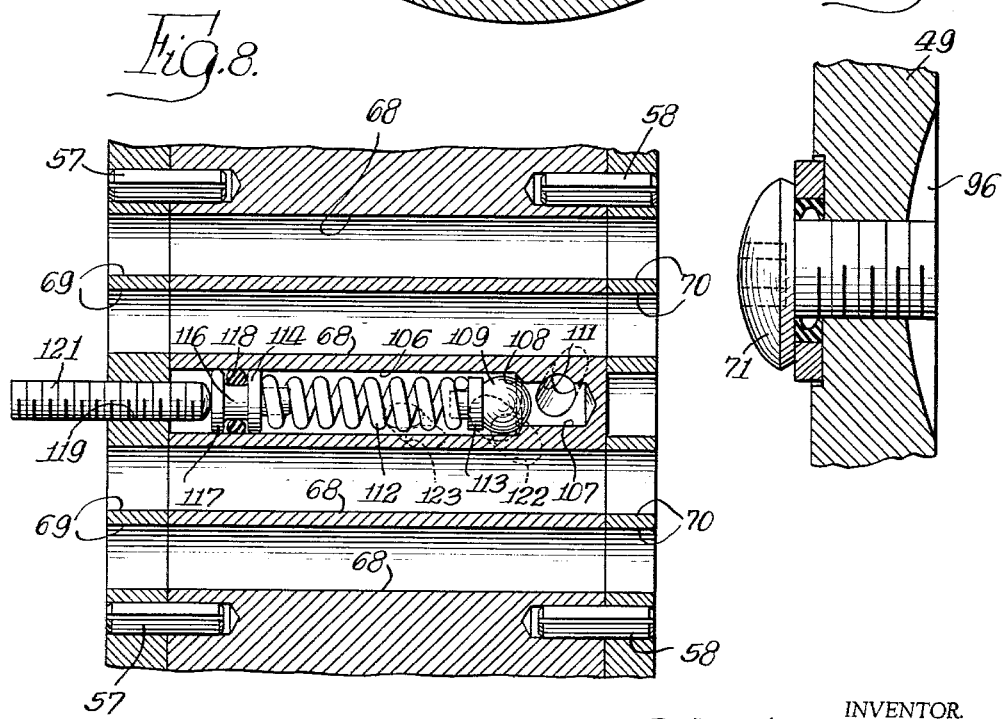
INVENTOR.
Robert B. Shulters
BY
Hibben, Noyes & Bicknell
Attys.

Nov. 2, 1965
R. B. SHULTERS
3,214,941
IMPULSE TOOL
Filed Sept. 27, 1963
4 Sheets-Sheet 4
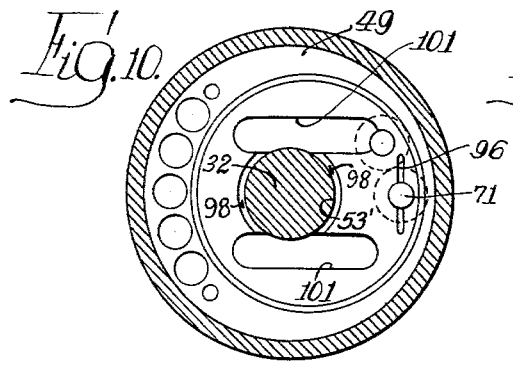
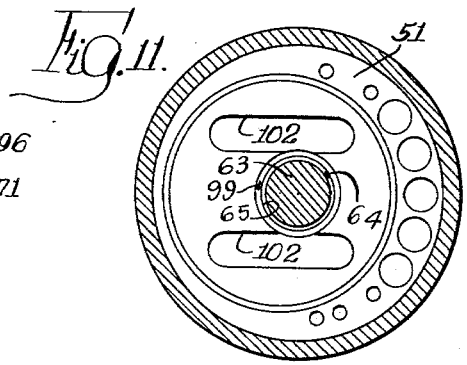
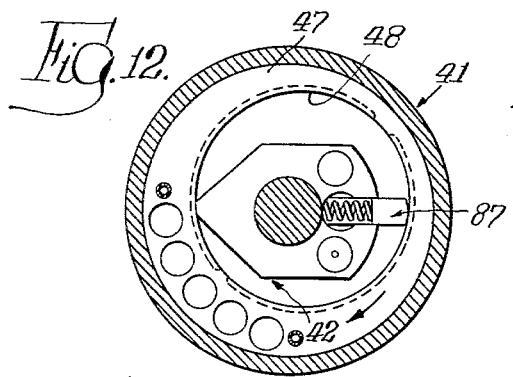
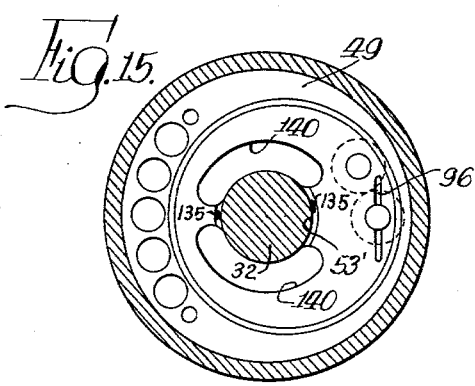
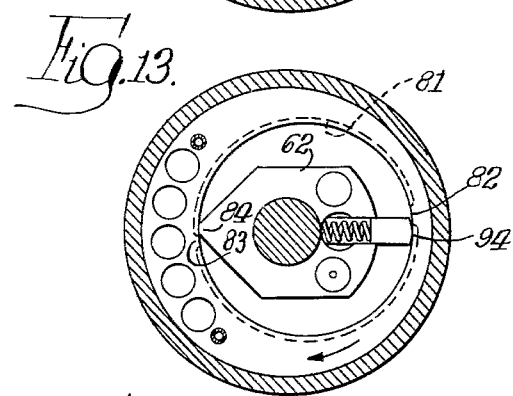
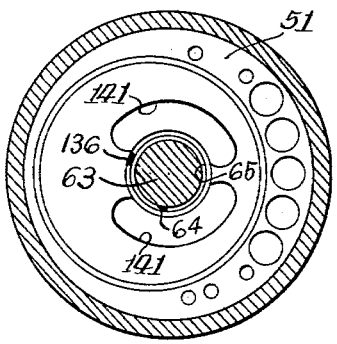
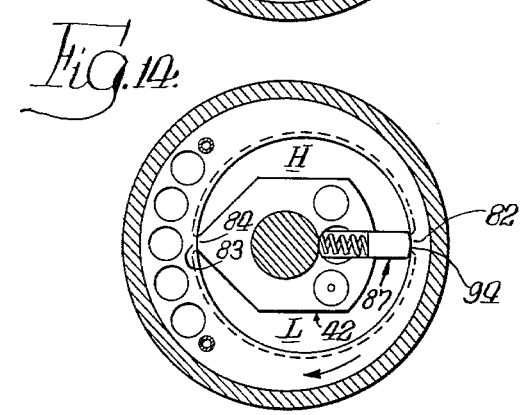
INVENTOR.
Robert B. Shulters,
BY
Hibben, Noyes & Bicknell
Attys.

United States Patent Office 3,214,941
Patented Nov. 2, 1965

3,214,941
IMPULSE TOOL
Robert B. Shulters, Batavia, Ill., assignor to Thor Power
Tool Company, Aurora, Ill., a corporation of Delaware
Filed Sept. 27, 1963, Ser. No. 312,053
9 Claims. (Cl. 64—26)

This invention relates to improvements in rotary, power driven, torque applying tools, such as a wrench or the like for driving nuts, bolts, screws or other fasteners.

In a conventional impact wrench, the kinetic energy of a massive rotating hammer member is transferred to a spindle member by repeated collision or striking between cooperating impact jaws on the hammer and spindle. Such tools have well-known disadvantages and limitations, particularly the relatively limited life of the impact jaws and the difficulty in the control of output torque.

In Donald K. Skoog U.S. Patent No. 3,116,617, issued January 7, 1964, a different type of tool known as an impulse tool is described and claimed in which the torque generating mechanism includes a pair of non-impacting or non-striking, relatively rotatable, eccentrically spaced members, one of which is driven by a motor and the other of which is adapted to mount a tool such as a nut or bolt engaging socket or the like. The space between the two members is filled with oil or other pressure transmitting liquid, and the internal structure is such that as one member rotates relative to the other, the pressure of the oil rapidly increases and decreases in a cyclic manner so as to create a series of impulses. These impulses are transmitted from the driving member to the driven member through the medium of the oil but without any direct physical impact or collision between jaws or other metal parts.

The present invention involves improvements in an impulse tool of the foregoing type and particularly certain improvements in the internal structure responsible for the generation of the impulses.

Accordingly, a primary object of the invention is to provide a novel and improved impulse tool of the general character described above.

A further object of the invention is to provide, in an impulse tool of the general character described, novel and improved means for obtaining impulses.

Another object of the invention is to provide, in an impulse tool of the general character described, novel and improved means for obtaining an intermittent fluid seal between a pair of relatively rotating members so as to generate cyclic impulses in a fluid between the members.

A more specific object of the invention is to provide, in an impulse tool of the aforementioned general character, a pair of relatively rotatable members with a radially slidable blade therebetween and novel and improved means for applying high fluid pressure at the inner end of the blade.

Other objects and advantages of the invention will become evident from the subsequent detailed description taken in conjunction with the accompanying drawings, wherein:

FIG. 1 is a front end elevational view of a tool comprising one specific embodiment of the invention;

FIG. 2 is a side elevational view, partially in section, taken along the line 2—2 of FIG. 1;

FIG. 3 is a reduced scale end elevational view of a portion of the internal mechanism of the tool as seen along the line 3—3 of FIG. 2;

FIG. 4 is a view similar to FIG. 3 but taken at the opposite end of the internal mechanism along the line 4—4 of FIG. 2;

FIG. 5 is an enlarged scale horizontal sectional view of the internal mechanism taken along the line 5—5 of FIG. 2;

FIG. 6 is a transverse sectional view taken along the line 6—6 of FIG. 5;

FIG. 7 is a fragmentary sectional view taken along the lines 7—7 of FIGS. 5 and 6;

FIG. 8 is a fragmentary developed sectional view taken along the line 8—8 of FIG. 6;

FIG. 9 is an enlarged fragmentary sectional view taken along the line 9—9 of FIG. 5;

FIGS. 10 and 11 are reduced scale sectional views showing the inside construction of the opposite end portions of the internal mechanism;

FIGS. 12–14 are reduced scale sectional views, generally similar to FIG. 6, showing successive operating positions of the internal mechanism of the tool; and FIGS. 15 and 16 are sectional views generally similar to FIGS. 10 and 11 but showing a modification of the invention.

For the sake of convenience, the present invention is illustrated in connection with a rotary power driven wrench or nut setter, but it will be understood that the principles of the invention which pertain to the torque generating or impulse unit may be utilized to advantage in a wide variety of power tools.

Referring first to FIGS. 1 and 2, the tool has a front casing section 21 and a rear casing section 22 with a depending handle portion 23, the front and rear casing sections being detachably connected, as by a plurality of cap screws 24. The rear casing section 22 contains a rotary air-actuated motor of a conventional type designated generally at 26. An air hose (not shown) may be connected to an air inlet connection 27 at the lower end of the handle portion 23, and the air supply to the motor 26 is controlled by means of a throttle valve assembly 28 movably mounted in the handle portion 23 and operable by a depressible trigger 29 for regulating the operation of the tool. An impulse unit 31 is contained within the front casing section 21, as hereinafter described in greater detail. The impulse unit 31 has a rotatable spindle with an elongated forward shaft portion 32 journaled in a bearing or bushing 33 which is mounted in an opening in the forward end of the casing section 21. The outer terminus of the spindle portion 32 is provided with a square end 34 having a depressible detent 35 for detachably mounting a nut or bolt engaging socket or other tool member.

Referring particularly to FIGS. 5–9, the impulse unit 31 comprises a housing assembly, indicated generally at 41, which is adapted to be driven by the air motor 26, and an internal spindle 42 having the forwardly projecting shaft portion 32 heretofore mentioned.

The housing assembly 41 includes an outer casing 43 having a flanged forward end 44 and an internally threaded rear end portion 46. A cylinder bushing 47 (FIGS. 5 and 6) having an eccentric internal cylinder cavity 48 is tightly fitted within the outer casing 43 and is disposed between a pair of forward and rear cap members 49 and 51 (FIG. 5), respectively, with O-ring seals 52 mounted in grooves 50 in the inner faces of the respective cap members opposite the axial ends of the bushing 47. The forward cap member 49 abuts the flange 44 and has a forwardly projecting tapered bearing portion 53 with a bore 53′ which receives the spindle shaft portion 32. A rotary O-ring seal 54 is mounted in an annular groove 55 in the bearing portion 53. An annular locking ring or nut 56 threadedly engages the casing opening 46 and abuts the rear cap member 51 for retaining the housing assembly 41 in unitary assembled relation. The front and rear cap members 49 and 51 are retained in predetermined orientation with respect to the eccentric cavity 48 of the bushing 47 by means of a plurality of roll pins 57 and 58 (FIGS. 6 and 8) which are fitted in suitable openings in the bushing and the respective cap members. As seen in FIG. 4, the inner periphery of the locking ring or nut 56 is provided with a plurality of recesses or serrations 59 so that after the nut 56 has been tightened to the desired extent, a set screw 60 can be inserted through one of the recesses 59 and threaded into a selected one of a plurality of threaded sockets 61 in the rear cap member 51 for locking the nut 56 in its tightened position. In the illustrated embodiment the weight of the housing assembly 41 has been reduced by providing a plurality of open axial bores 68 (FIGS. 6 and 8) in the thicker wall portion of the bushing 47, four such bores 68 being shown in this instance. Corresponding openings 69 and 70 are provided in the cap members 49 and 51, respectively, in alignment with the opposite ends of the bores 68.

The spindle 42 has an enlarged central portion 62 with an irregular generally polygonal cross-sectional configuration disposed within the eccentric cylinder cavity 48 of the bushing 47, as best seen in FIG. 6. A short integral stub shaft portion 63 (FIG. 5) projects rearwardly from the spindle portion 62 and is fitted with a bearing sleeve 64 which is journaled in a socket 65 provided in a projecting boss portion 66 on the rear cap member 51. The opposite end of the spindle is journaled in the bearing portion 53 of the front cap member 49 by means of the elongated integral shaft portion 32 (FIG. 5) heretofore described. The spindle shaft portions 32 and 63 are coaxial with the axis of rotation of the housing assembly 41.

The eccentric cylinder cavity 48 of the bushing 47 is filled with a suitable oil or other pressure transmitting liquid, and a detachable fill plug 71 (FIGS. 3 and 5) is provided in the front cap member 49 for filling the cavity 48 with oil. A removable vent plug 72 (FIG. 3) is also provided in the cap member 49 adjacent the plug 71 for venting air from the cavity 48 during the introduction of oil. The rear cap member 51 has a hexagonal drive connection 73 (FIG. 5) projecting from the boss portion 66 and engaging a driving socket connection 74 (FIG. 2) on the air motor 26. Thus, when the air motor 26 is in operation, the housing assembly 41 (comprising 43, 47, 49, 51, and 56) of the impulse unit 31 is rotated and, as described in detail below, fluid pressure impulses are generated in and are transmitted through the oil medium to the spindle 42.

The eccentric cavity 48 of the bushing 47 is provided with a pair of circumferentially extending recesses or undercuts, as designated at 81 (FIGS. 5 and 6), intermediate the opposite ends of the bushing 47, and these circumferential recesses 81 are interrupted by a pair of diametrically disposed axially extending lands or seal points 82 and 83. At one side of the spindle axis the spindle portion 62 is tapered and terminates in a restricted axially extending edge portion 84 which spans the recesses 81 and is adapted to be aligned in temporary sealing engagement with the axially extending land 83 during relative rotation of the housing assembly and the spindle. The opposite side of the spindle portion 62 is curved, as at 85 (FIG. 6), and is also provided with a radially extending slot 86 disposed opposite the tapered edge portion 84. A generally T-shaped blade 87 having a central stem portion 88 and a crossbar portion 89 is mounted in the slot 86 with the stem portion 88 and the inner marginal edge of the cross-bar portion 89 extending into and having a close sliding fit in the slot 86 (FIG. 5) and with the cross-bar portion 89 also extending axially of the bushing 47 and spanning the recesses 81. A pair of compression springs 91 are disposed in suitable bores 92 (FIG. 5) in the spindle portion 62 at the base of the slot 86 and extend into a pair of aligned bores 93 in the axially projecting end portions of the blade portion 89 for normally urging the blade 87 outwardly toward the wall of the bushing cavity 48. As best seen in FIG. 6, the outer axially extending edge of the blade portion 89 is rounded or curved, as at 94, to provide intermittent sealing engagement with the axially extending land 82 during relative rotation of the housing assembly and the spindle.

Referring now to FIGS. 6 and 12–14, a typical operating cycle of the tool will be described. As seen in FIG. 12, the housing assembly 41, including the bushing 47, is being driven in a clockwise direction by the air motor 26, as indicated by the arrow. The square end 34 on the forward spindle shaft 32 is assumed to be in engagement through a suitable socket (not shown) with a fastener element (not shown) such as a nut or bolt which is to be tightened. At the outset of the tightening operation, very little torque resistance is encountered by the spindle and, consequently, the frictional engagement of the spring-pressed blade 87 with the inner wall of the bushing cavity 48 is sufficient to cause the spindle 42 to rotate in a clockwise direction in unison with the rotating housing assembly 41.

As tightening of the fastener element proceeds and substantial torque resistance is encountered by the rotating spindle 42, the housing assembly 41 begins to rotate relative to and ahead of the spindle 42. At this time, because of the eccentric shape of the cavity 48, the oil or other pressure transmitting fluid is free to flow between opposite sides of the spindle so that the pressure throughout the cavity 48 is substantially uniform. However, as will be evident from FIG. 12, as the housing assembly 41 continues to rotate in a clockwise direction relative to the spindle 42, the volume of the cavity 48 below the spindle 42 is gradually increasing whereas the volume of the cavity 48 above the spindle 42 is gradually decreasing.

FIG. 13 shows the position of the parts of the impulse unit just before the impulse point. As will be recognized, the land 83 is approaching a temporary dynamically sealed relationship with the tapered edge 84 of the spindle portion 62 and, in the same fashion, the land 82 is approaching dynamic sealing relation with the outer edge 94 of the blade 87. At the same time, the volume of the upper portion of the cavity 48 above the spindle 42 has continued to decrease, but oil is still free to flow between opposite sides of the spindle through the recesses or undercuts 81.

In FIG. 14, the housing assembly 41 has rotated very slightly beyond the FIG. 13 position so that the lands 82 and 83 are now in dynamic sealing relation with respect to the blade 87 and the spindle edge 84, and oil is no longer free to flow between opposite sides of the spindle through the recesses 81. As a result of this sudden sealing-off of the fluid, a momentary substantial increase in fluid pressure is obtained in the upper portion of the cavity 48, as indicated by the letter H to designate the high pressure zone. In the lower sealed-off portion of the cavity 48, the fluid pressure is substantially lower, is designated by the letter L to indicate the low pressure zone. In a typical example, the pressure in the zone H may be as high as 3,000 lbs. per square inch. This momentary pressure increase in the zone H imposes an eccentric force on the blade 87 and thereby causes the spindle 42 to rotate in a clockwise direction to tighten the fastener element.

As the housing assembly 41 rotates beyond its FIG. 14 position ahead of the spindle 42, the fluid pressure in the cavity 48 is again substantially equalized by reason of the eccentric shape of the cavity 48 and the free fluid communication provided by the recesses or undercuts 81 once the moving parts have passed beyond the dynamic seal point illustrated in FIG. 14. Continued rotation of the housing assembly 41 causes the foregoing cycle to be repeated with the result that successive pressure increases are generated in the high pressure zone H of the cavity 48 and these pressure increases result in impulses which are imparted to the spindle 42 through the medium of the fluid and the blade 87 until the desired tightening operation has been completed.

Because of the rapid rotation of the housing assembly 41, it will be understood that the dynamic sealing relationship described above is repeated over and over again. However, to insure proper operation of the tool, a small static leakage between the relatively rotatable housing assembly 41 and spindle 42 is provided. For example, in assembling the impulse unit 31, the casing nut 56 is tightened sufficiently to retain the inner faces of the end cap members 49 and 51 in dynamic sealing relationship with the opposite axial ends of the spindle portion 62, but the operating clearance therebetween is sufficient to allow a predetermined static leakage between the high and low pressure sides of the cavity 48. This relationship is necessary in order to insure that excessive driving torque from the air motor 26 will not be required in order to rotate the housing assembly 41 beyond the dynamic sealing position illustrated in FIG. 14.

As a further aid in this respect, it is preferred to provide the inner face of one of the housing cap members with a groove of predetermined dimensions which is capable of transmitting fluid pressure between the high and low pressure sides of the cavity when the operating parts are in dynamic sealed relation. For example, as illustrated in FIG. 9, the inner face of the forward cap member 49 is provided with a small metering groove 96 which extends diametrically across the oil fill opening in which the fill plug 71 is mounted. Thus, when the blade 87 and the tapered spindle edge 84 are in sealed alignment with the lands 82 and 83, as illustrated in FIG. 5, the zones H and L are placed in restricted communication through the groove 96 which is of sufficient length to extend across the thickness of the blade 87. Further control over the fluid pressure communication through the groove 96 may be effected by altering the length of the threaded shank of the fill plug 71, the inner end of which extends into the groove 96. Thus, it is possible to compensate for slight variations in manufacturing clearance, and this adjustment will ordinarily be made at the factory and requires no further correction in the field.

A bore or passageway, illustrated at 97 in FIG. 5, extends angularly through the tapered bearing portion 53 of the forward cap member 49 and communicates at one end with the cavity 48 and at its other end with the O-ring groove 55 in order to relieve oil pressure under the O-ring 54. At the dynamic seal condition of the impulse unit, high pressure fluid tends to bleed from the high pressure zone H of cavity 48 along the forward spindle shaft 32 into the O-ring groove 55 and may thence pass through the angular bore 97 to the low pressure zone L of the cavity 48.

In the foregoing description of the operation of the impulse unit, it will be recognized that in order to achieve the intermittent dynamically sealed relationship as required for the generation of impulses, it is essential that the movable blade 87 be held in sealing relationship with the land 82 during the impulse period of each revolution. The pressure exerted by the springs 91 is not sufficient for this purpose, and it is, therefore, necessary to provide suitable means for imposing the high fluid pressure generated in the zone H of the cavity 48 against the inner end of the blade 87. It is necessary that the blade 87 be positively urged into temporary sealed relation with respect to the land 82 in order to obtain the desired generation of an impulse during each revolution of the housing assembly 41. Consequently, there must be an extremely rapid build-up of fluid pressure behind the blade 87 so as to insure the desired seal. Otherwise, the mechanism will merely rotate rapidly without creating the required impulses for rotating the spindle 42. The present invention accomplishes this result in a simple and highly advantageous manner by means of suitable slots or grooves in the inner faces of the end cap members 49 and 51, as best seen in FIGS. 10 and 11.

As seen in FIG. 10, the inner face of the end cap member 49 is provided with a pair of parallel elongated slots or grooves 101 which, in this instance, intersect the bore 53' in the bearing portion 53. When the spindle is in dynamically sealed relation with the lands 82 and 83, it will be understood that one of the slots 101 is disposed in the high pressure zone H of the cavity 48, dependent upon the direction of rotation of the tool. As seen in FIG. 11, the inner face of the rear cap member 51 is also provided with a similar pair of elongated slots 102 which, in this instance, intersect with the socket 65. Dependent upon the direction of rotation of the tool, one of the slots 102 is also disposed in the high pressure zone H of the cavity 48 at the opposite end of the spindle from the slots 101 when the spindle and housing are in dynamically sealed relation, as seen in FIG. 6. Thus, it will be seen that during a predetermined portion of the cycle of rotation of the housing 41 just prior to the position of dynamic sealing between the spindle and the housing, the slots 101 and 102 are aligned in direct fluid communication with the slot 86 and provide direct passages for the increasing pressure of the fluid in zone H to the opposite ends of the slot 86. Thus, fluid from the zone H has free access to the slot 86 through the slots 101 and 102 in the end cap members, and the increasing pressure of this fluid acts on the inner longitudinal edge surfaces of the blade portion 89, which project axially beyond the stem portion 88, thereby urging the blade outwardly into sealing engagement with the land 82. As best seen in FIGS. 5 and 10, the corner edge at the intersection of the bore 53' with the inner face of the cap member 49 is chamfered, as at 98, thereby providing restricted arcuate passages or channels between the slots 101 and the slot 86. Consequently, when the spindle and housing reach the position of dynamic sealing, at which point the slots 101 and 102 are out of register with the ends of the slot 86, there is limited communication of the ultimate high pressure fluid from the zone H through the slots 101 and the restricted arcuate passages formed by the chamfers 98 to the slot 86. Similarly, the corner edges at the intersection of the socket 65 with the inner face of the cap member 51 have chamfers 99 to provide restricted fluid passages between the slots 102 and the slot 86.

The above-described construction affords numerous advantages over other arrangements for pressure loading the blade, such as the provision of a check valve-controlled bore communicating through the spindle between the inner end of the slot and the high pressure zone H. The end cap slot arrangement is rapid acting and provides a relatively short fluid passage for transmission of pressure to the inside of the blade. In addition, the structure is simple and uncomplicated in that it eliminates internal passage and valve arrangements in the spindle.

To reverse the operation of the tool, the direction of rotation of the air motor 26 is reversed, thereby rotating the housing assembly 41 in the opposite direction and consequently interchanging the high and low pressure zones H and L illustrated in FIGS. 6 and 12–14. Thus, the mechanism is readily reversible and proper pressure loading of the blade 87 is not dependent upon the operation of a check valve or the like in an internal fluid pressure passageway.

Although in the illustrated embodiment the housing assembly 41 is driven by the air motor 26 and the spindle 42 drives the tool member, it will be appreciated that these functions may be interchanged by minor and obvious modifications of the structure. Thus, the rear spindle shaft portion 63 can be connected to the air motor 26 and the forward cap member 49 of the housing assembly 41 can be modified to mount the tool member.

One of the principle advantages of an impulse tool, in addition to the elimination of impacts or collisions between metal parts, is the facility with which such an impulse mechanism lends itself to the control of output torque of the tool. Certain minor provisions for controlling the pressure differential between the high and low pressure sides of the impulse unit have been described above for the purpose of minimizing the torque requirements of the air motor 26. However, in order to provide a positive upper limit on the torque output of the impulse unit, an adjustable pressure relief valve is preferably provided which will prevent the fluid pressure in the high pressure zone H from exceeding a predetermined maximum.

One such pressure relief arrangement is shown in FIGS. 5, 6, and 8 and comprises a centrally located axial bore 106 in the bushing 47 adjacent the land 83. As shown in FIGS. 5 and 8, the bore 106 is open at the forward end of the bushing 47 adjacent the forward cap member 49 but is closed at its opposite or rearward end adjacent the cap member 51. The rearward end of the bore 106 has a reduced diameter portion 107 providing an annular shoulder 108 constituting a valve seat for a ball element 109. High pressure fluid from the zone H communicates with the bore portion 107 through an angular drilled passage 111 in the bushing 47. The ball element 109 is normally retained in seated relation on the shoulder 108 by means of a spring 112 having its inner end operatively engaging the ball 109 through a cap member 113. The opposite end of the spring 112 seats against a flange 114 of a piston member 116 disposed adjacent the forward end of the bore 106. The piston 116 has another flange 117 spaced from the flange 114 with an O-ring seal 118 mounted therebetween. An adjusting screw 121 is mounted in a threaded opening 119 in the end cap member 49 and engages the outer end of the piston 116 for regulating the position of the piston 116 within the bore 106 and the degree of compression of the spring 112. A tension plug 120, of nylon or the like, is provided in the cap member 49 and engages the threads of the screw 121 for retaining the latter in adjusted position.

When high pressure fluid in the bore portion 107 exceeds a predetermined pressure, which is dependent upon the pressure exerted by the spring 112 as determined by the adjusting screw 121, the ball 109 is disengaged from its seat 108 and the high pressure fluid bleeds into the bore 106 and thence through a drilled angular passage 122 in the bushing 47 into the low pressure zone L of the cavity 48. For additional pressure relief capacity, if needed, a further drilled passageway 123 may be provided which also communicates between the bore 106 and the low pressure zone L. Thus, when the spindle 42 encounters a predetermined torque resistance during a tightening operation, the pressure in the high pressure zone H of the cavity 48 will tend to build up because of the limited rotatability of the spindle at which point the relief ball valve 109 will open so as to prevent the imposition of excessive torque on the fastening element.

Referring to FIGS. 1 and 2, the front casing section 21 of the tool is provided with a front opening 124 through which an Allen wrench or other tool may be inserted for adjustment of the relief valve screw 121 after the spindle end 34 has been rotated by hand to bring the screw 121 into alignment with the hole 124.

In the illustrated embodiment, the spindle portion 62 is provided with a pair of bores 126 and 127 (FIG. 7) which extend from the rear end of the spindle portion 62 and terminate before the forward end of the spindle portion 62. The mouth of the bore 126 is fitted with a plug 128 containing a small orifice opening 129. A piston element 130, similar to the piston 116 heretofore described, is movably mounted in the bore 126 with a spring 131 to provide an expansion chamber or reservoir for accommodating expansion and contraction of the oil or other pressure transmitting fluid contained in the cavity 48. The reservoir 126 thereby compensates for operating and ambient temperature changes and also for any slight leakage loss of oil during use of the tool. The orifice opening 129 is sufficiently restricted so that the reservoir or expansion chamber 126 and the piston 130 are not affected to any appreciable extent by the fluctuating pressure generated in the cavity 48 during operation of the tool. The mouth of the bore 127 is fitted with an imperforate plug 132 so as to provide an empty chamber for the sake of balancing the spindle 42.

FIGS. 15 and 16 are inner face views of the end cap members 49 and 51 showing a modification of the invention wherein the pressure loading grooves or slots have an arcuate configuration. Thus, in FIG. 15 the end cap member 49 has a pair of curved slots or grooves 140 intersecting the bore 53', and in FIG. 16 the end cap member 51 has a similar pair of curved slots or grooves 141 intersecting the bore 65. The slots 140 and 141 perform the same function heretofore described in connection with the slots 101 and 102, but in some instances the curved slots will be preferred in order to provide more effective and rapid pressure loading of the blade 87 over a greater portion of the cycle of relative rotation between the housing and the spindle. Likewise, the corner edges of the shaft openings in the end cap members 49 and 51 are chamfered, as at 135 and 136 in FIGS. 15 and 16, respectively, for the purpose previously described in connection with FIGS. 10 and 11.

Although the invention has been described with particular reference to certain specific structural embodiments thereof, it should be understood that various modifications and equivalent structures may be resorted to without departing from the scope of the invention as defined in the appended claims.

I claim:

1. In an impulse tool including housing means comprising a cylinder having an eccentric internal cavity containing a pressure-transmitting fluid and a pair of end cap members disposed at the opposite axial ends of said cylinder, and internal spindle means rotatable relative to said housing means, one of said housing and spindle means being adapted to be rotatably driven, and said housing means and said spindle means having cooperating seal portions for generating intermittent pressure increases in a sealed-off portion of said fluid in response to rotation of said one means whereby to effect rotation of the other of said housing and spindle means; the improvement which comprises means defining a radially extending slot in said spindle means, a blade slidably disposed in said slot for engaging the interior of said housing means, and recess means in the inner faces of said end cap members in direct fluid communication with said slot at the axial ends of said spindle means during a predetermined portion of the relative rotation between said spindle means and said housing means for applying increased fluid pressure from said fluid in said cavity to the inside of said blade for urging the blade outwardly into sealing relation with said housing means.

2. The structure of claim 1 further characterized in that said blade has a generally T-shaped configuration comprising an inner stem portion received in said slot and an outer cross portion extending axially beyond each side of said stem portion and engaging said housing means, said increased fluid pressure acting against the inside of said cross portion for urging the latter outwardly into sealing engagement with said housing means.

3. The structure of claim 2 further characterized by the provision of spring means coacting between the base of said slot and said cross portion of said blade for normally holding said cross portion in contact with said housing means.

4. An impulse tool comprising housing means including a cylinder with an eccentric cavity filled with a pressure-transmitting fluid and a pair of end cap members disposed at the opposite axial ends of said cylinder, the wall of said cylinder having a pair of axially extending lands at opposite sides of said cavity, spindle means disposed in said cavity with end shaft portions journaled in said end cap members, one of said housing and spindle means being adapted to be rotatably driven and the other of said means being adapted to mount a tool member, said spindle means having at one side thereof a radially projecting axially extending edge portion and at the opposite side thereof a radially extending slot, a blade slidably disposed in said slot with an axially extending outer edge portion, said lands being alignable in dynamic sealing relation with said edge portions of said spindle means and said blade during rotation of said one means whereby to generate intermittent pressure increases in a sealed-off portion of said fluid between said lands and thereby effecting rotation of the other of said housing and spindle means, and recess means in the inner faces of said end cap members in direct fluid communication with said slot at the axial ends of said spindle means during a predetermined portion of the relative rotation between said spindle means and said housing means for applying increased fluid pressure from said fluid in said cavity to the inside of said blade and thereby urging the blade outwardly into sealing relation with its cooperating land.

5. An impulse tool comprising a rotatably driven housing including a cylinder with an eccentric cavity filled with a pressure-transmitting fluid and a pair of end cap members disposed at opposite axial ends of said cylinder, the wall of said cylinder having a pair of axially extending lands at opposite sides of said cavity, a spindle having a body portion disposed in said cavity and end shaft portions journaled in said end cap members, one of said shaft portions projecting from said housing for mounting a tool member, said body portion of said spindle having at one side thereof a radially projecting axially extending edge portion and at the opposite side thereof a radially extending slot, a blade slidably disposed in said slot with an axially extending outer edge portion, said lands being alignable in dynamic sealing relation with said edge portions of said spindle body portion and said blade during rotation of said housing relative to said spindle whereby to generate intermittent pressure increases in a sealed-off portion of said fluid between said lands and thereby effecting rotation of said spindle and blade, and recess means in the inner faces of said end cap members in direct fluid communication with said slot at the axial ends of said spindle means during a predetermined portion of the relative rotation between said housing and said spindle for applying increased fluid pressure from said fluid in said cavity to the inside of said blade and thereby urging the blade outwardly into sealing relation with its cooperating land.

6. The structure of claim 1 further characterized in that said recess means comprises at least one straight groove in the inner face of each of said end cap members.

7. The structure of claim 1 further characterized in that said recess means comprises at least one arcuate groove in the inner face of each of said end cap members.

8. The structure of claim 4 further characterized in that said end cap members are provided with openings for journalling said end shaft portions of said spindle means, said recess means intersecting said openings, and the edges of said openings at the inner faces of said end cap members being chamfered to provide restricted fluid passages communicating between said recesses and said slot for applying high fluid pressure from said sealed-off portion of said fluid to the inside of said blade.

9. The structure of claim 5 further characterized in that said end cap members are provided with openings for journalling said end shaft portions of said spindle, said recess means intersecting said openings, and the edges of said openings at the inner faces of said end cap members being chamfered to provide restricted fluid passages communicating between said recesses and said slot for applying high fluid pressure from said sealed-off portion of said fluid to the inside of said blade.

References Cited by the Examiner

UNITED STATES PATENTS

| | | | |
|---|---|---|---|
| 1,997,788 | 4/35 | Friedell | 192—58 |
| 2,588,342 | 3/52 | Bidwell | 103—136 |
| 2,832,293 | 4/58 | Adams et al. | 103—136 |
| 3,116,617 | 1/64 | Skoog | 64—26 |

BROUGHTON G. DURHAM, *Primary Examiner.*